US006636397B2

(12) United States Patent
Gill (10) Patent No.: US 6,636,397 B2
(45) Date of Patent: Oct. 21, 2003

(54) LEAD OVERLAY SPIN VALVE SENSOR WITH ANTIFERROMAGNETIC LAYERS IN PASSIVE REGIONS FOR STABILIZING A FREE LAYER

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 290 days.

(21) Appl. No.: 09/814,135

(22) Filed: Mar. 20, 2001

(65) Prior Publication Data

US 2002/0135953 A1 Sep. 26, 2002

(51) Int. Cl.[7] ............................. G11B 5/127; G11B 5/39
(52) U.S. Cl. ................................................. 360/324.12
(58) Field of Search ..................... 360/324.12, 324.1, 360/324, 313, 110, 327.3, 327.31, 327.32

(56) References Cited

U.S. PATENT DOCUMENTS

| 4,663,685 A |   | 5/1987  | Tsang .................. 360/327.32 |
|---|---|---|---|
| 4,713,708 A |   | 12/1987 | Krounbi et al. ........ 360/327.32 |
| 4,914,538 A |   | 4/1990  | Howard et al. ............. 360/322 |
| 5,528,440 A |   | 6/1996  | Fontana et al. ........ 360/324.12 |
| 5,729,411 A |   | 3/1998  | Kishi et al. ............ 360/327.32 |
| 5,742,162 A | * | 4/1998  | Nepela et al. .............. 324/252 |
| 5,949,623 A |   | 9/1999  | Lin ........................ 360/324.12 |
| 6,040,961 A |   | 3/2000  | Gill ........................ 360/327.11 |
| 6,074,767 A |   | 6/2000  | Lin ............................. 428/692 |
| 6,154,348 A | * | 11/2000 | Suzuki ......................... 360/324 |
| 6,266,218 B1 | * | 7/2001  | Carey et al. ........... 360/324.12 |
| 6,515,573 B1 | * | 2/2003  | Dong et al. ............... 338/32 R |

FOREIGN PATENT DOCUMENTS

| JP | 08287426 | 11/1996 |
|---|---|---|
| JP | 09097409 | 4/1997 |

OTHER PUBLICATIONS

*IBM Technical Discl. Bulletin* vol. 39 n. 4, Apr. 1996"Continuous Spacer Spin Valve Structure".

* cited by examiner

*Primary Examiner*—Julie Anne Watko
(74) *Attorney, Agent, or Firm*—Ervin F. Johnston (57) ABSTRACT

First and second hard bias layers abut first and second side surfaces of a spin valve sensor and first and second lead layers are connected to the sensor for conducting a sense current transversely therethrough. The spin valve sensor has a transverse length between the first and second side surfaces which is divided into a track width region between first and second passive regions wherein the track width region is defined by a space between the first and second lead layers. A free layer in the sensor has first and second passive portions in the first and second passive regions and the first and second passive portions have first and second surfaces respectively. First and second antiferromagnetic (AFM) layers are exchange coupled to the first and second surfaces of the free layer for longitudinally biasing the first and second passive portions of the free layer.

25 Claims, 5 Drawing Sheets

FIG. 11

LEAD OVERLAY SPIN VALVE SENSOR WITH ANTIFERROMAGNETIC LAYERS IN PASSIVE REGIONS FOR STABILIZING A FREE LAYER

BACKGROUND OF THE INVENTION

1. Field of the Invention

The present invention relates to a lead overlay spin valve sensor with antiferromagnetic layers in passive regions for stabilizing a free layer and, more particularly, to such sensors which are highly sensitive and stable even though they have a small track width.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure 90° to an air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from a rotating magnetic disk. The quiescent position, which is parallel to the ABS, is the position of the magnetic moment of the free layer structure when the sense current is conducted through the sensor in the absence of signal fields.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of $\cos \theta$, where $\theta$ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top or a bottom spin valve sensor depending upon whether the pinning layer is located near the bottom of the sensor close to the first read gap layer or near the top of the sensor close to the second read gap layer. Spin valve sensors are further classified as simple pinned or antiparallel pinned depending upon whether the pinned layer structure is one or more ferromagnetic layers with a unidirectional magnetic moment or a pair of ferromagnetic layers that are separated by a coupling layer with magnetic moments of the ferromagnetic layers being antiparallel. Spin valve sensors are still further classified as single or dual wherein a single spin valve sensor employs only one pinned layer and a dual spin valve sensor employs two pinned layers with the free layer structure located therebetween.

A typical spin valve sensor has top and bottom surfaces and first and second side surfaces which intersect the ABS. Prior art read heads employ first and second hard bias layers and first and second lead layers that abut the first and second side surfaces for longitudinally biasing and stabilizing the free layer in the sensor and conducting a sense current transversely through the sensor. The track width of the head is measured between the centers of the side surfaces of the free layer. In an effort to reduce the track width to submicron levels it has been found that the hard bias layers make the free layer magnetically stiff so that its magnetic moment does not freely respond to field signals from a rotating magnetic disk. Accordingly, there is a strong-felt need to provide submicron track width spin valve sensors which are still sensitive to the signals from the rotating magnetic disk along with longitudinal biasing of the free layer transversely so that the free layer is kept in a single magnetic domain state.

SUMMARY OF THE INVENTION

The present invention provides a submicron track width bottom spin valve sensor wherein the free layer is highly sensitive to field signals from a rotating magnetic disk even though the free layer is longitudinally biased for stabilization purposes. The spin valve sensor has a transverse length between the first and second side surfaces which is divided into a track width region between first and second passive regions wherein the track width region is defined by the first and second lead layers. The free layer, which is at the top of the sensor, has first and second passive portions in the first and second passive regions wherein the first and second passive portions have first and second top surfaces respectively. As in the prior art, the first and second hard bias layers still abut the first and second side surfaces of the spin valve sensor. The first and second lead layers overlap the first and second top surfaces of the free layer and are electrically connected thereto for conducting the sense current through the sensor. Accordingly, the first and second hard bias layers are located outwardly with respect to the first and second lead layers. A space between the first and second lead layers in a central portion of the spin valve sensor defines the track width of the head and the aforementioned track width region which can be submicron. By locating the first and second hard bias layers remotely from the track width region the hard bias layers do not make the free layer in the track width region insensitive to field signals from the rotating magnetic disk. Unfortunately, however, a portion of the first and second passive portions of the spin valve sensor are not sufficiently biased and are not magnetically stable. Further, these passive portions perform side reading on each side of a track being read by the active portion of the sensor, between the lead layers, which introduces errors into the signal. Still further, the remote location of the hard bias layers may not provide full stabilization of the free layer in the active track width region. This problem has been overcome by providing first and second antiferromagnetic layers which are exchange coupled to the first and second top surfaces respectively of the free layer in the first and second passive portions of the free layer. This exchange coupling orients the magnetic moment of the first and second passive portions of the free layer parallel to the ABS which, by magnetostatic coupling, orients the magnetic moment of the active region of the free layer parallel to the ABS. The first and second antiferromagnetic layers are conductive so that the first and second lead layers can be formed thereon for conducting the sense current through the sensor.

It is important that a blocking temperature of the first and second antiferromagnetic layers be lower than the blocking temperature of the pinning layer. The blocking temperature is the temperature at which the magnetic spins of the antiferromagnetic layer are free to move around when subjected to an extraneous field. The setting of the magnetic spins of the first and second antiferromagnetic layers is subsequent to the setting of the spins of the pinning layer and must not reorient the spins of the pinning layer. Accordingly, if the blocking temperature of the first and second antiferromagnetic layers is less than the blocking temperature of the pinning layer the magnetic spins of the pinning layer can be set by a first step involving heat to the blocking temperature in the presence of a magnetic field perpendicular to the ABS and, after constructing the magnetic head on a wafer, the head may be subjected to heating of the first and second antiferromagnetic layers to their blocking temperature in the presence of a field parallel to the ABS for appropriately setting the magnetic spins of the antiferromagnetic layers.

An object is to provide a submicron spin valve sensor with a highly stabilized free layer which is highly responsive to signals from a rotating magnetic disk.

Another object is to provide the aforementioned sensor wherein the pinning layer is not degraded by a scheme for longitudinally biasing the free layer.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
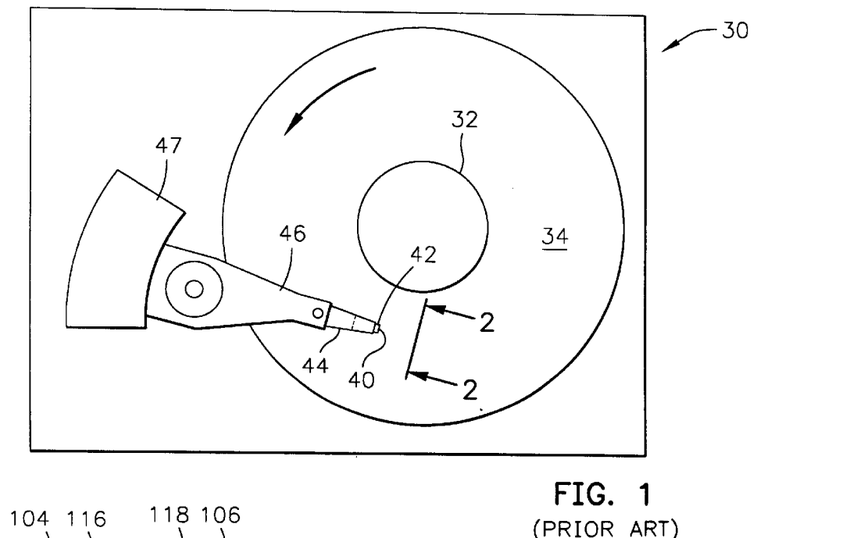
FIG. 1 is a plan view of a magnetic disk drive.
Figure 2:
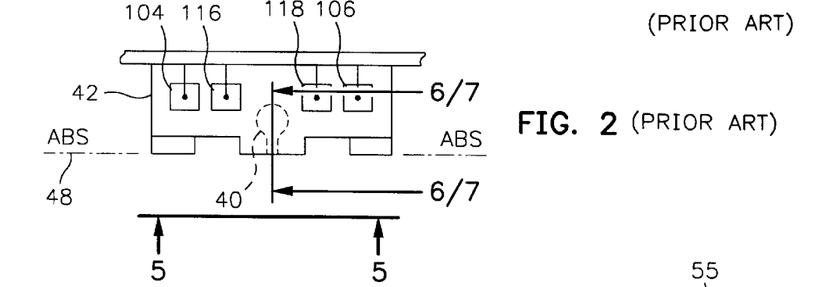
FIG. 2 is an end view of a slider with a magnetic head of the disk drive as seen in plane 2—2 of FIG. 1.
Figure 3:
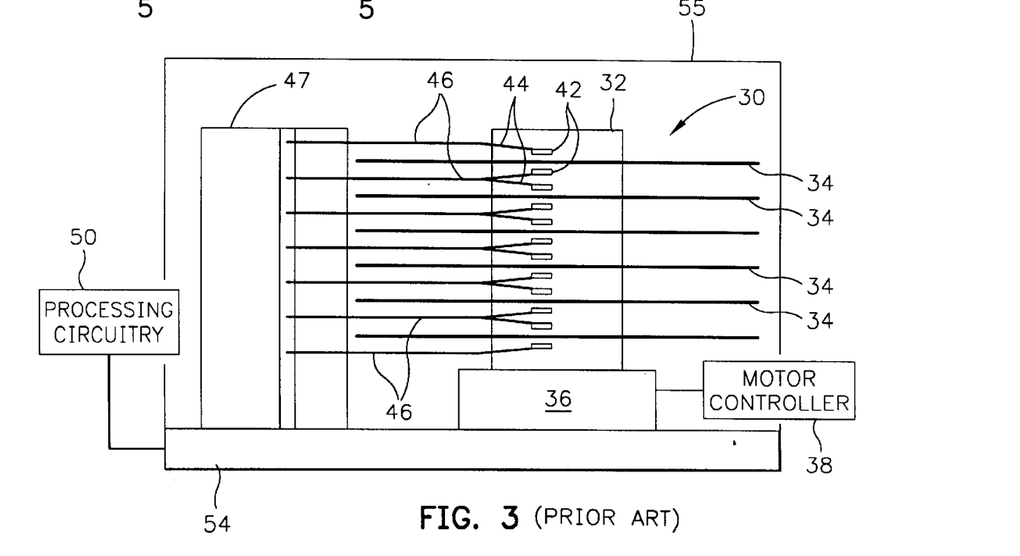
FIG. 3 is an elevation view of the magnetic disk drive wherein multiple disks and magnetic heads are employed.
Figure 4:
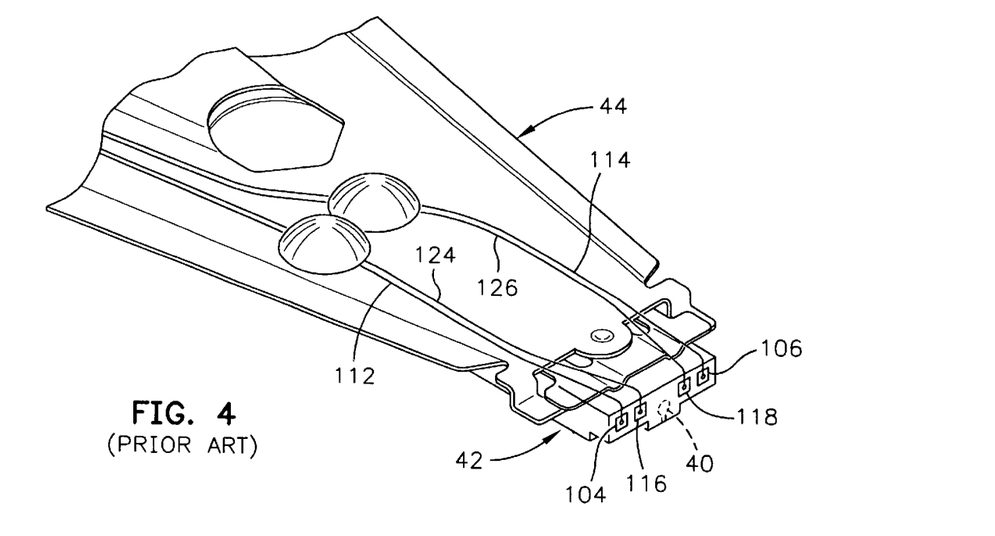
FIG. 4 is an isometric illustration of a suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
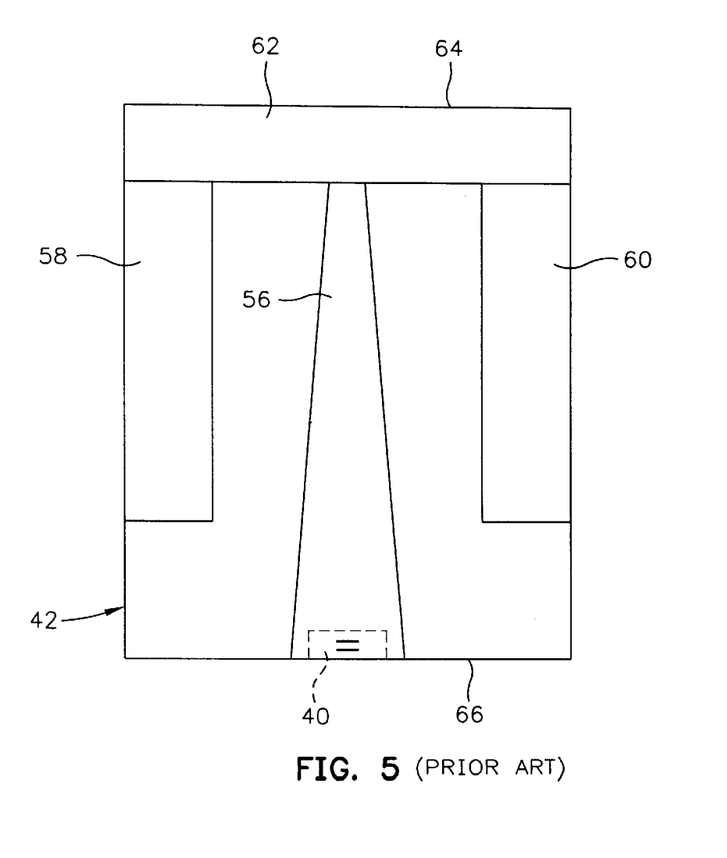
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
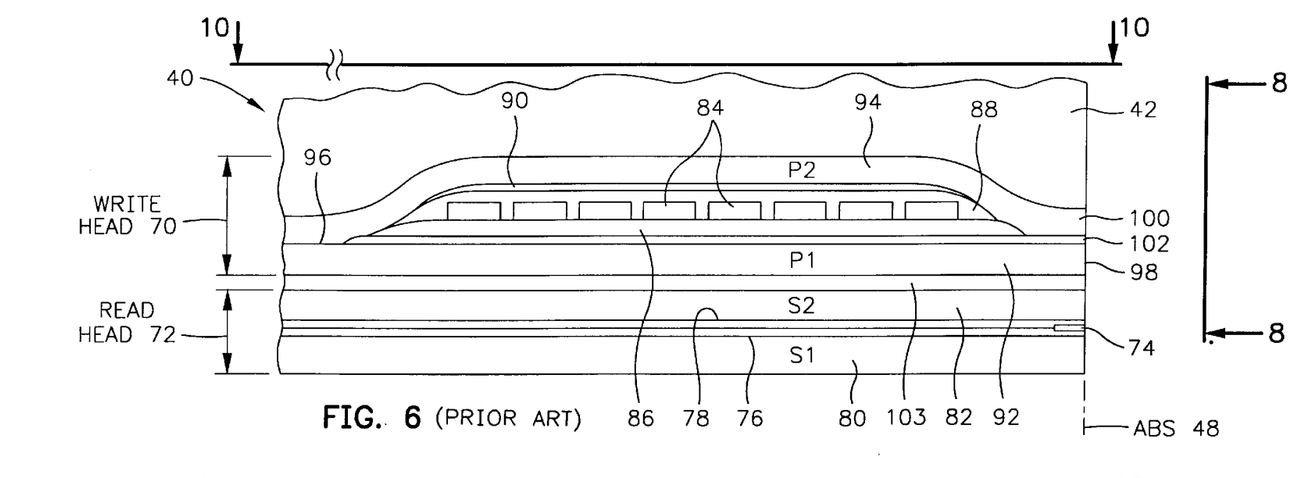
FIG. 6 is a partial view of the slider and a piggyback magnetic head as seen in plane 6—6 of FIG. 2.
Figure 8:
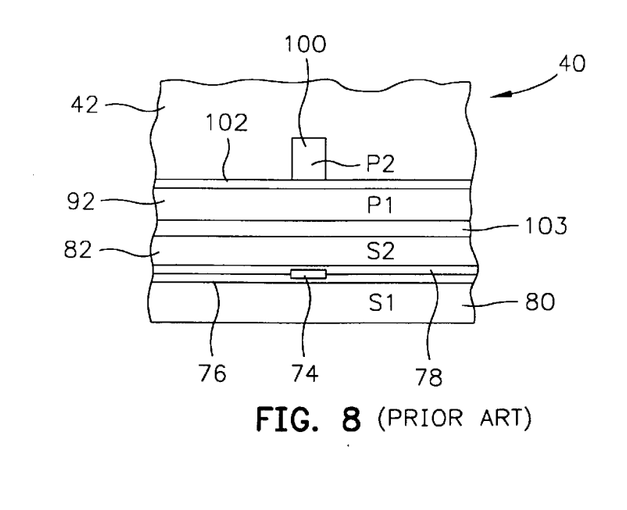
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a dual spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current Is conducted through the sensor causes these resistance changes to be manifested as potential changes. These potential changes are then processed as readback signals by the processing circuitry 50 shown in FIG. 3.

Figure 10:
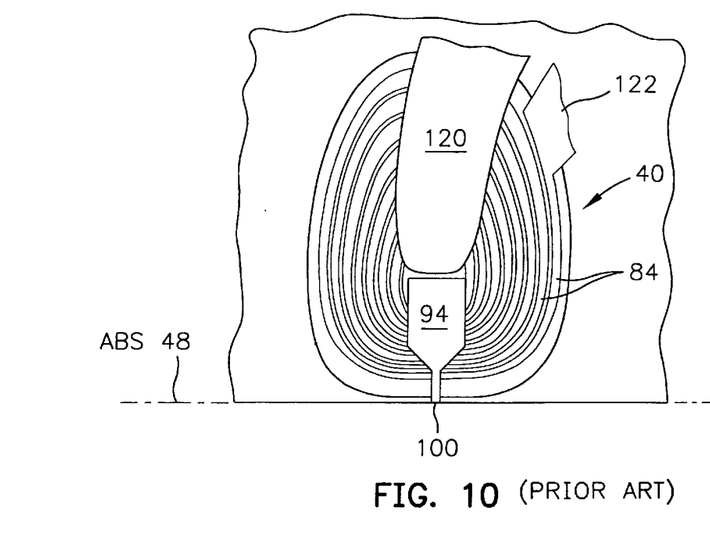
FIG. 10 is a view taken along plane 10—10 of FIGS. 6 or 7 with all material above the coil layer and leads removed.

The write head portion 70 of the magnetic head 40 includes a write coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
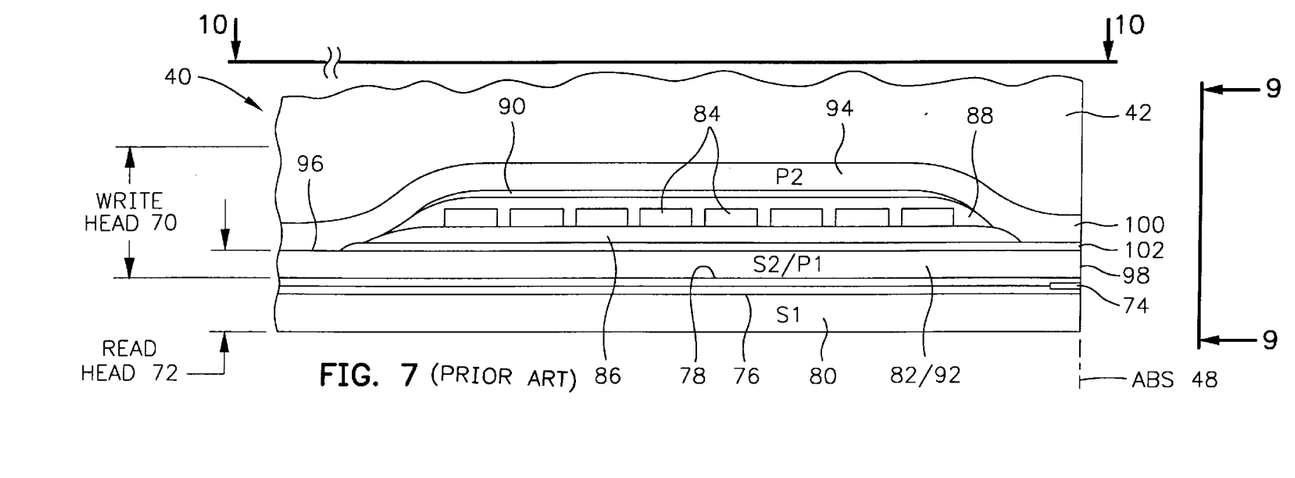
FIG. 7 is a partial view of the slider and a merged magnetic head as seen in plane 7—7 of FIG. 2.
Figure 9:
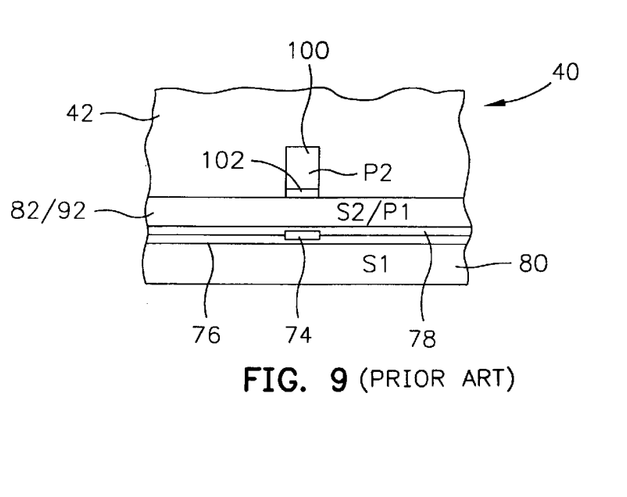
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

The Invention

Figure 11:
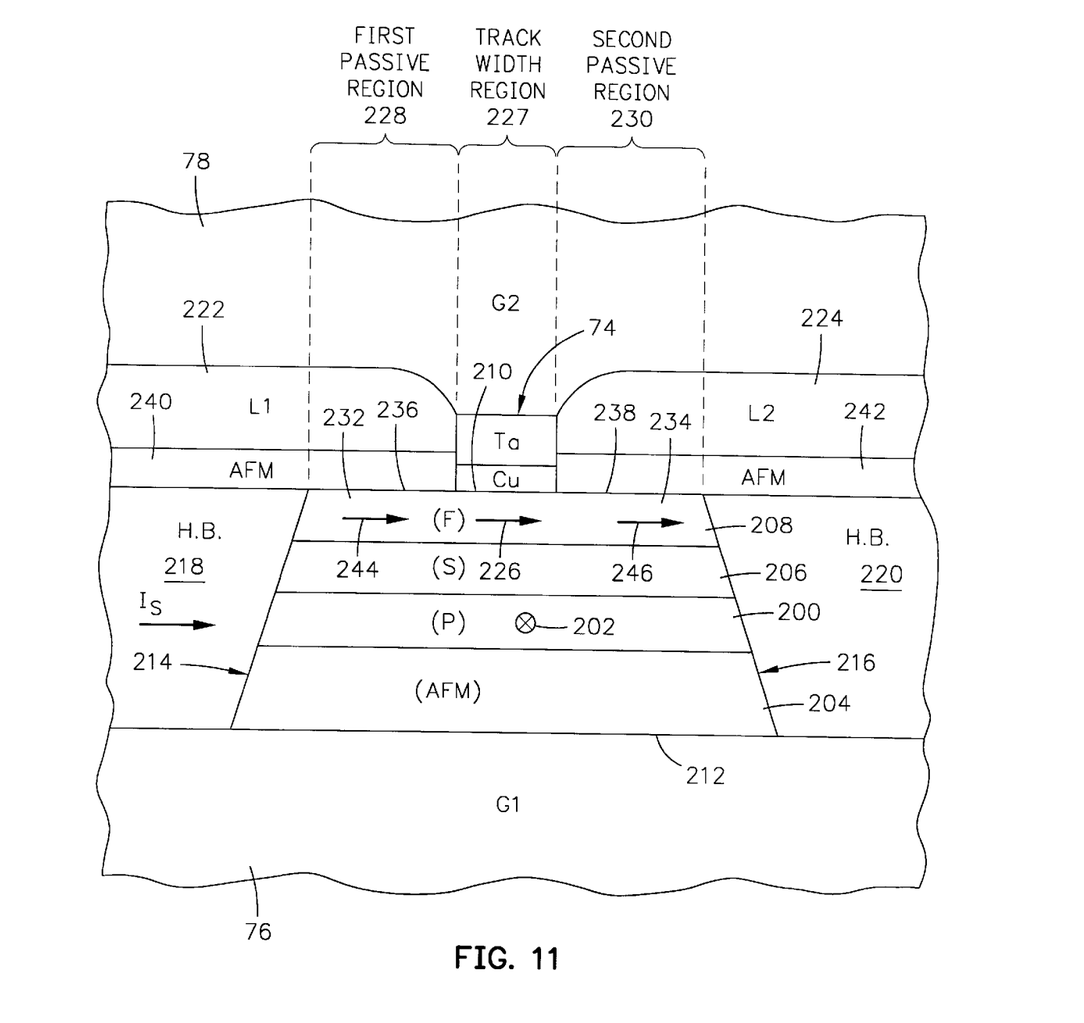
FIG. 11 is an enlarged isometric illustration of the read head with the present spin valve sensor.

FIG. 11 is an ABS illustration of the present read head which has the spin valve sensor 74 located between the first and second read gap layers 76 and 78. The spin valve sensor includes a ferromagnetic pinned layer (P) 200 which has a magnetic moment 202. A pinning layer 204 is exchange coupled to the pinned layer for pinning the magnetic moment 202 perpendicular to the ABS such as out of the sensor or into the sensor as shown in FIG. 11. A nonmagnetic electrically conductive spacer layer (S) 206 is located between the pinned layer 200 and a free layer (F) 208. This type of sensor is known as a bottom spin valve sensor since the pinning layer 204 is at the bottom of the sensor and the free layer 208 is at the top of the sensor.

The spin valve sensor is partially bounded by top and bottom surfaces 210 and 212 and first and second side surfaces 214 and 216 which intersect the ABS. First and second hard bias layers (HB) 218 and 220 abut the first and second side surfaces 214 and 216 for magnetostatically stabilizing the free layer 208. First and second lead layers (L1) and (L2) 222 and 224 are electrically connected to the sensor for conducting a sense current Is therethrough. A magnetic moment 226 of the free layer 208 is oriented parallel to the ABS. When a field signal from a rotating magnetic disk rotates the magnetic moment 226 of the free layer into the sensor the magnetic moments 226 and 202 become more parallel which reduces the resistance of the sensor and when the field signal from the rotating magnetic disk rotates the magnetic moment 226 out of the sensor the magnetic moments 226 and 202 become more antiparallel which increases the resistance of the sensor. These increases and decreases in the resistance of the sensor are processed as playback signals by the processing circuitry 50 in FIG. 3.

The spin valve sensor has a transverse length between the first and second side surfaces 214 and 216 which is divided into a track width region 227 located between first and second passive regions 228 and 230 wherein the track width region is defined by a space between the first and second lead layers 222 and 224. The free layer has first and second passive portions 232 and 234 in the first and second passive regions which, in turn, have first and second top surfaces 236 and 238 respectively.

First and second antiferromagnetic (AFM) layers 240 and 242 are exchange coupled to the first and second top surfaces 236 and 238 for longitudinally biasing the first and second passive portions 232 and 234 of the free layer. The AFM layers 240 and 242 are also conductive so that the first and second lead layers 222 and 224 thereon are electrically connected to the sensor. It should be noted that the first and second AFM layers extend from at least the first and second side surfaces 214 and 216 to the track width region 227 and that the first and second hard bias layers 218 and 220 are located at the first and second side surfaces 214 and 216. This places the first and second hard bias layers 218 and 220 remote from the track width region 227 so that they do not magnetically stiffen the magnetic moment 226 of the free layer, which stiffening makes the free layer insensitive to field signals from the rotating magnetic disk. However, because of this remoteness the magnetostatic coupling decays toward the center of the free layer leaving portions of the first and second passive portions 232 and 234 of the free layer unstable and able to perform undesirable side reading on the rotating magnetic disk. This problem has been overcome by the first and second AFM layers 240 and 242 which stabilize first and second magnetic moments 244 and 246 of the first and second passive portions of the free layer which, by magnetostatic coupling with the track width portion of the free layer, magnetically stabilize the magnetic moment 226.

By a combination of the hard bias layers 218 and 220 and the AFM layers 240 and 242, the AFM layers 240 and 242 may be maintained relatively thin so as to lower their blocking temperature. The blocking temperature is the temperature at which the magnetic spins of the AFM layers are free to rotate when subjected to an extraneous field. It is important that the blocking temperature of the AFM layers 240 and 242 be less than the blocking temperature of the pinning layer 204 so that the magnetic spins of the AFM layers 240 and 242 can be set after the setting of the magnetic spins of the pinning layer 204 without disturbing the orientation of the magnetic spins of the pinning layer 204. A suitable material for the first and second AFM layers 240 and 242 is palladium manganese (PdMn) which has a blocking temperature between 200 °–250° C. If the first and second AFM layers are made of this material this blocking temperature can be still further lowered by making the AFM layers relatively thin, such as 150 Å. With such a thickness the blocking temperature can be made less than 200° C. A suitable material for the pinning layer 202 is platinum manganese which has a blocking temperature of 240° C.

Discussion

It should be understood that each of the free and pinned layers 208 and 200 may be multifilm layers and further, that the pinned layer 200 may be an antiparallel (AP) pinned layer structure. Further, it should be understood that the present invention is not confined to a bottom spin valve sensor but could also be applied to a top spin valve sensor wherein the first and second AFM layers 240 and 242 would be at the bottom of the sensor for pinning first and second passive regions of a bottom located free layer.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head which has an air bearing surface (ABS), comprising:
    a spin valve sensor including:
        a ferromagnetic pinned layer that has a magnetic moment;
        a pinning layer exchange coupled to the pinned layer for pinning the magnetic moment of the pinned layer;
        a free layer; and
        a nonmagnetic electrically conductive spacer layer located between the free layer and the pinned layer structure;
    the spin valve sensor being partially bounded by top and bottom surfaces and first and second side surfaces which intersect the ABS;
    first and second hard bias layers abutting the first and second side surfaces respectively of the spin valve sensor;
    first and second lead layers connected to the spin valve sensor for conducting a sense current transversely therethrough;
    the spin valve sensor having a transverse length between the first and second side surfaces which is divided into a track width region between first and second passive regions wherein the track width region is defined by a space between said first and second lead layers;
    the free layer having first and second passive portions in the first and second passive regions which have first and second surfaces respectively; and
    first and second antiferromagnetic (AFM) layers exchange coupled to said first and second surfaces for longitudinally biasing the first and second passive portions of the free layer.

2. A magnetic read head as claimed in claim 1 including:
    nonmagnetic electrically nonconductive first and second read gap layers;
    the spin valve sensor being located between the first and second read gap layers;
    ferromagnetic first and second shield layers; and
    the first and second read gap layers being located between the first and second shield layers.

3. A magnetic read head as claimed in claim 2 wherein the first and second antiferromagnetic layers extend from the first and second side surfaces of the sensor respectively to the track width region of the sensor.

4. A magnetic read head as claimed in claim 2 wherein the first and second antiferromagnetic layers have a blocking temperature which is less than a blocking temperature of the pinning layer.

5. A magnetic read head as claimed in claim 4 wherein the first and second antiferromagnetic layers extend from the first and second side surfaces of the sensor respectively to the track width region of the sensor.

6. A magnetic head assembly having an air bearing surface (ABS), comprising:
    a write head including:
        ferromagnetic first and second pole piece layers that have a yoke portion located between a pole tip portion and a back gap portion;
        a nonmagnetic write gap layer located between the pole tip portions of the first and second pole piece layers;
        an insulation stack with at least one coil layer embedded therein located between the yoke portions of the first and second pole piece layers; and
        the first and second pole piece layers being connected at their back gap portions; and
    a read head including:
        a spin valve sensor;
        nonmagnetic electrically nonconductive first and second read gap layers;
        the spin valve sensor being located between the first and second read gap layers;
        a ferromagnetic first shield layer; and
        the first and second gap layers being located between the first shield layer and the first pole piece layer; and
    the spin valve sensor including:
        a ferromagnetic pinned layer that has a magnetic moment;
        a pinning layer exchange coupled to the pinned layer for pinning the magnetic moment of the pinned layer;
        a free layer; and
        a nonmagnetic electrically conductive spacer layer located between the free layer and the pinned layer;
    the spin valve sensor being partially bounded by top and bottom surfaces and first and second side surfaces which intersect the ABS;
    first and second hard bias layers abutting the first and second side surfaces respectively of the spin valve sensor;
    first and second lead layers connected to the spin valve sensor for conducting a sense current transversely therethrough;
    the spin valve sensor having a transverse length between the first and second side surfaces which is divided into a track width region between first and second passive regions wherein the track width region is defined by a space between said first and second lead layers;
    the free layer having first and second passive portions in the first and second passive regions which have first and second surfaces respectively; and
    first and second antiferromagnetic (AFM) layers exchange coupled to said first and second surfaces for longitudinally biasing the first and second passive portions of the free layer.

7. A magnetic head assembly as claimed in claim 6 including:
    a ferromagnetic second shield layer;
    a nonmagnetic isolation layer located between the second shield layer and the first pole piece layer.

8. A magnetic head assembly as claimed in claim 6 wherein the first and second antiferromagnetic layers extend from the first and second side surfaces of the sensor respectively to the track width region of the sensor.

9. A magnetic head assembly as claimed in claim 6 wherein the first and second antiferromagnetic layers have a blocking temperature which is less than a blocking temperature of the pinning layer.

10. A magnetic head assembly as claimed in claim 9 wherein the first and second antiferromagnetic layers extend from the first and second side surfaces of the sensor respectively to the track width region of the sensor.

11. A magnetic disk drive including at least one magnetic head assembly that has an air bearing surface (ABS) and that includes a write head and a read head, comprising:
   a write head including:
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   a read head including:
      a spin valve sensor;
      nonmagnetic electrically nonconductive first and second read gap layers;
      the spin valve sensor being located between the first and second read gap layers;
      a ferromagnetic first shield layer; and
      the first and second read gap layers being located between the first shield layer and the first pole piece layer; and the spin valve sensor including:
         a ferromagnetic pinned layer that has a magnetic moment;
         a pinning layer exchange coupled to the pinned layer for pinning the magnetic moment of the pinned layer;
         a free layer; and
         a nonmagnetic electrically conductive spacer layer located between the free layer and the pinned layer;
   the spin valve sensor being partially bounded by top and bottom surfaces and first and second side surfaces which intersect the ABS;
   first and second hard bias layers abutting the first and second side surfaces respectively of the spin valve sensor;
   first and second lead layers connected to the spin valve sensor for conducting a sense current transversely therethrough;
   the spin valve sensor having a transverse length between the first and second side surfaces which is divided into a track width region between first and second passive regions wherein the track width region is defined by a space between said first and second lead layers;
   the free layer having first and second passive portions in the first and second passive regions which have first and second surfaces respectively;
   first and second antiferromagnetic (AFM) layers exchange coupled to said first and second surfaces for longitudinally biasing the first and second passive portions of the free layer;
   a housing;
   a magnetic disk rotatably supported in the housing;
   a support mounted in the housing for supporting the magnetic head assembly with said ABS facing the magnetic disk so that the magnetic head assembly is in a transducing relationship with the magnetic disk;
   a spindle motor for rotating the magnetic disk;
   an actuator positioning means connected to the support for moving the magnetic head assembly to multiple positions with respect to said magnetic disk; and
   a processor connected to the magnetic head assembly, to the spindle motor and to the actuator for exchanging signals with the magnetic head assembly, for controlling movement of the magnetic disk and for controlling the position of the magnetic head assembly.

12. A magnetic disk drive as claimed in claim 11 including:
   a ferromagnetic second shield layer;
   a nonmagnetic isolation layer located between the second shield layer and the first pole piece layer.

13. A magnetic disk drive as claimed in claim 11 wherein the first and second antiferromagnetic layers extend from the first and second side surfaces of the sensor respectively to the track width region of the sensor.

14. A magnetic disk drive as claimed in claim 11 wherein the first and second antiferromagnetic layers have a blocking temperature which is less than a blocking temperature of the pinning layer.

15. A magnetic disk drive as claimed in claim 14 wherein the first and second antiferromagnetic layers extend from the first and second side surfaces of the sensor respectively to the track width region of the sensor.

16. A method of making a magnetic read head which has an air bearing surface (ABS), comprising the steps of:
   a making a spin valve sensor comprising the steps of:
      forming a ferromagnetic pinned layer that has a magnetic moment;
      forming a pinning layer exchange coupled to the pinned layer for pinning the magnetic moment of the pinned layer;
      forming a free layer; and
      forming a nonmagnetic electrically conductive spacer layer located between the free layer and the pinned layer;
   forming the spin valve sensor with top and bottom surfaces and first and second side surfaces which intersect the ABS;
   forming first and second hard bias layers abutting the first and second side surfaces respectively of the spin valve sensor;
   forming first and second lead layers connected to the spin valve sensor for conducting a sense current transversely therethrough;
   forming the spin valve sensor with a transverse length between the first and second side surfaces which is divided into a track width region between first and second passive regions wherein the track width region is defined by a space between said first and second lead layers;
   forming the free layer with first and second passive portions in the first and second passive regions which have first and second surfaces respectively;
   forming first and second antiferromagnetic (MM) layers exchange coupled to said first and second surfaces for longitudinally biasing the first and second passive portions of the free layer.

17. A method of making a magnetic read head as claimed in claim 16 including:
   forming nonmagnetic electrically nonconductive first and second read gap layers;
   forming the spin valve sensor between the first and second read gap layers;
   forming ferromagnetic first and second shield layers; and forming the first and second read gap layers between the first and second shield layers.

18. A method of making a magnetic read head as claimed in claim 17 wherein the first and second antiferromagnetic layers are formed to extend from the first and second side surfaces of the sensor respectively to the track width region of the sensor.

19. A method of making a magnetic read head as claimed in claim 17 wherein the first and second antiferromagnetic layers are formed with a blocking temperature which is less than a blocking temperature of the pinning layer.

20. A method of making a magnetic read head as claimed in claim 19 wherein the first and second antiferromagnetic layers are formed to extend from the first and second side surfaces of the sensor respectively to the track width region of the sensor.

21. A method of making magnetic head assembly that has an air bearing surface (ABS), comprising the steps of:

making a write head including the steps of:

forming ferromagnetic first and second pole piece layers in pole tip, yoke and back gap regions wherein the yoke region is located between the pole tip and back gap regions;

forming a nonmagnetic electrically nonconductive write gap layer between the first and second pole piece layers in the pole tip region;

forming an insulation stack with at least one coil layer embedded therein between the first and second pole piece layers in the yoke region; and connecting the first and pole piece layers at said back gap region; and making a read head including the steps of:

forming nonmagnetic electrically nonconductive first and second read gap layers;

forming a spin valve sensor between the first and second read gap layers;

forming the first and second read gap layers between the first shield layer and the first pole piece layer; and a making of the spin valve sensor comprising the steps of:

forming a ferromagnetic pinned layer that has a magnetic moment;

forming a pinning layer exchange coupled to the pinned layer for pinning the magnetic moment of the pinned layer;

forming a free layer; and forming a nonmagnetic electrically conductive spacer layer located between the free layer and the pinned layer;

forming the spin valve sensor with top and bottom surfaces and first and second side surfaces which intersect the ABS;

forming first and second hard bias layers abutting the first and second side surfaces respectively of the spin valve sensor;

forming first and second lead layers connected to the spin valve sensor for conducting a sense current transversely therethrough;

forming the spin valve sensor with a transverse length between the first and second side surfaces which is divided into a track width region between first and second passive regions wherein the track width region is defined by a space between said first and second lead layers;

forming the free layer with first and second passive portions in the first and second passive regions which have first and second surfaces respectively;

forming first and second antiferromagnetic (AFM) layers exchange coupled to said first and second top surfaces for longitudinally biasing the first and second passive portions of the free layer.

22. A method of making a magnetic head assembly as claimed in claim 21 including the steps of:

forming a ferromagnetic second shield layer; and forming a nonmagnetic isolation layer between the second shield layer and the first pole piece layer.

23. A method of making a magnetic head assembly as claimed in claim 21 wherein the first and second antiferromagnetic layers are formed to extend from the first and second side surfaces of the sensor respectively to the track width region of the sensor.

24. A method of making a magnetic head assembly as claimed in claim 21 wherein the first and second antiferromagnetic layers are formed with a blocking temperature which is less than a blocking temperature of the pinning layer.

25. A method of making a magnetic head assembly as claimed in claim 24 wherein the first and second antiferromagnetic layers are formed to extend from the first and second side surfaces of the sensor respectively to the track width region of the sensor.

* * * * *